INVENTORS
ROBERT HARDIGAN
VINCENT MAIELI
BY Raymond R. Skolnick

WORLD WIDE MAGNETIC VARIATION COMPUTER

WORLD WIDE MAGNETIC VARIATION COMPUTER

Filed Nov. 12, 1963 4 Sheets-Sheet 3

WORLD WIDE MAGNETIC VARIATION COMPUTER

Filed Nov. 12, 1963 4 Sheets-Sheet 4

INVENTORS
ROBERT HARDIGAN
VINCENT MAIELI
BY
Raymond R. Skolnick 3,415,980
WORLD WIDE MAGNETIC VARIATION COMPUTER Vincent Maieli, North Bellmore, and Robert Hardigan, Bronx, N.Y., assignors to Sperry Rand Corporation, Ford Instrument Company Division, Long Island City, N.Y., a corporation of Delaware Filed Nov. 12, 1963, Ser. No. 322,726
9 Claims. (Cl. 235—150.271)

Our invention relates to a navigational apparatus, and more particularly to such an apparatus designed to automatically compute magnetic variation, true heading and grid heading information over greater portions of the earth's surface than has heretofore been possible.

Numerous navigational systems employ a magnetic compass to provide an indication of magnetic heading with respect to vehicle location. It is known that the magnetic and geographic poles do not coincide, with the angular difference therebetween varying over the earth's surface. Accordingly, it has been the practice to employ a storage means to yield magnetic variation information as a function of present location. The variation correction is then added to the magnetic heading signal to provide true heading information. The storage means may typically be a three-dimensional cam having a surface configuration representative of magnetic variation as functions of longitude and latitude. That is, the cam is rotatable about its axis responsive to one of the dependent variables, i.e., longitude; with the cam follower being moved along the length of the cam responsive to the other dependent variable, i.e., latitude. Accordingly, the position of the cam follower is responsive to the stored magnetic variation information as read out by the longitude and latitude positioning.

The generating range of such cam mechanisms and similar storage devices has been found to be limited by the maximum slope of the stored function that can be conveniently translated by the follower without jamming. Good design practice typically limits the rise or pressure angle of such cam surfaces to 30°. Accordingly, to so limit the rise angle at regions of the earth's surface having a greater variation gradient, it has become the practice to smooth out the sharp rises in the cam surface. This smoothing of the cam surface introduces smoothing errors, which errors in magnetic variation are greatest in the polar regions.

Further, the magnetic variation over the earth's surface is known to periodically change, and accordingly necessitates the introduction of an annual change correction has also been found to be excessive in the polar regions. Accordingly, the high gradient of both the magnetic variation and its annual change in the polar regions, has restricted the operation of prior magnetic variation computers to exclude a substantial portion of the earth's surface.

Our invention advantageously avoids this limitation, by operating the cam storage unit in conjunction with a scale factor generator. More specifically, the magnetic variation signal obtained by the computer is combinedly related to both the cam follower location and an externally generated scale factor signal, which scale factor signal increases in those portions of the earth's surface having an excessive magnetic variation or annual change gradient. The utilization of the scale factor signal allows a corresponding decrease in the rise angle of the cam surface, and permits operation over substantially 98% of the earth's surface. Within the remaining portion of the earth's surface a gyro command signal is generated to automatically switch over to the free gyro mode of navigation.

As another advantageous aspect of our invention, an annual correction adjustment is included to update the computer in accordance with the known magnetic variation data for an extended period; as, for example, ten years. Accordingly, whereas the previous devices have necessitated the bothersome and costly changing of storage cams on an annual basis, our apparatus advantageously permits such long term use by the provision of a simple correction factor.

As still another advantageous aspect of our invention, the compass heading input signal adapted to be automatically combined with the computed magnetic variation, thereby providing a true heading output signal. Advantageously a deviation correction may also be introduced in this portion of the apparatus to correct disturbances in the vehicle.

As still another advantageous aspect of our invention, the generated true heading signal may be combined with a convergence factor signal (the latter signal being dependent on the map system in use) to derive a grid heading output signal.

It is, therefore, seen that the basic concept of our invention resides in providing an improved navigational apparatus for generating one or more of a magnetic variation signal, true heading signal or grid heading signal, with such apparatus being operable over substantially 98% of the earth's surface.

It is therefore a primary object of this invention to accurately generate magnetic variation information throughout substantially 98% of the earth's surface.

Another object of this invention is to combine the output of a three-dimensional cam storage unit with a scale factor signal to permit a reduction of the rise angle of the cam surface over those portions thereof, corresponding to an excessive gradient of the stored function.

A further object of this invention is to provide a navigational apparatus including storage means and periodic correction means, for computing magnetic variation over extended time intervals, while avoiding the necessity of periodically changing the basic storage devices.

An additional object of this invention is to provide a navigational apparatus including means for automatically generating one or more of magnetic variation, true heading or grid heading output signals.

Still another object of this invention is to provide such a navigational apparatus, wherein the output signals are time corrected for annual change in magnetic variation.

Still a further object of this invention is to provide such a navigational apparatus operable over a substantial portion of the earth's surface adjacent the polar region.

Still and additional object of this invention is to provide a navigational apparatus for the computation of magnetic variation, annually corrected for long term changes, employing three-dimensional storage cams and a scale factor generator, cooperating toward cam smoothing errors over regions of the earth's surface having an excessive variation gradient.

Yet another object of our invention is to provide such a navigational apparatus including means for generating true heading and grid heading information.

These as well as other objects of our invention will readily become apparent upon a consideration of the following description and accompanying drawings in which.

FIGURES 4*a*–4*e* depict the voltage waveforms generated by the scale factor generator of our invention.

Figure 5:
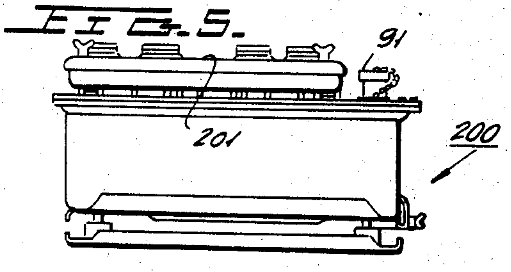
Figure 5B:
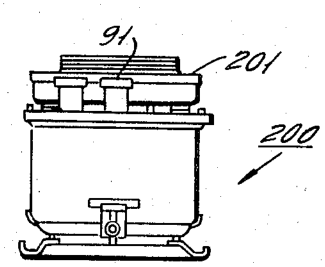
Figure 5A:
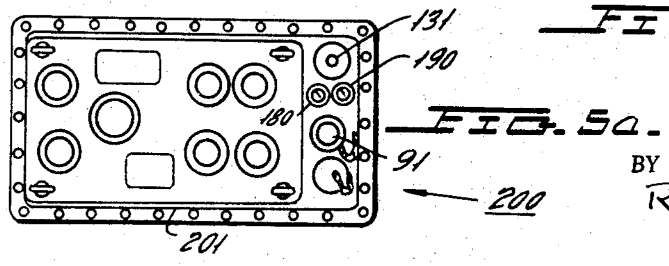

FIGURES 5, 5*a*, and 5*b* are front elevation, plan and end views respectively of a navigational apparatus constructed in accordance with our invention.

Figure 1:
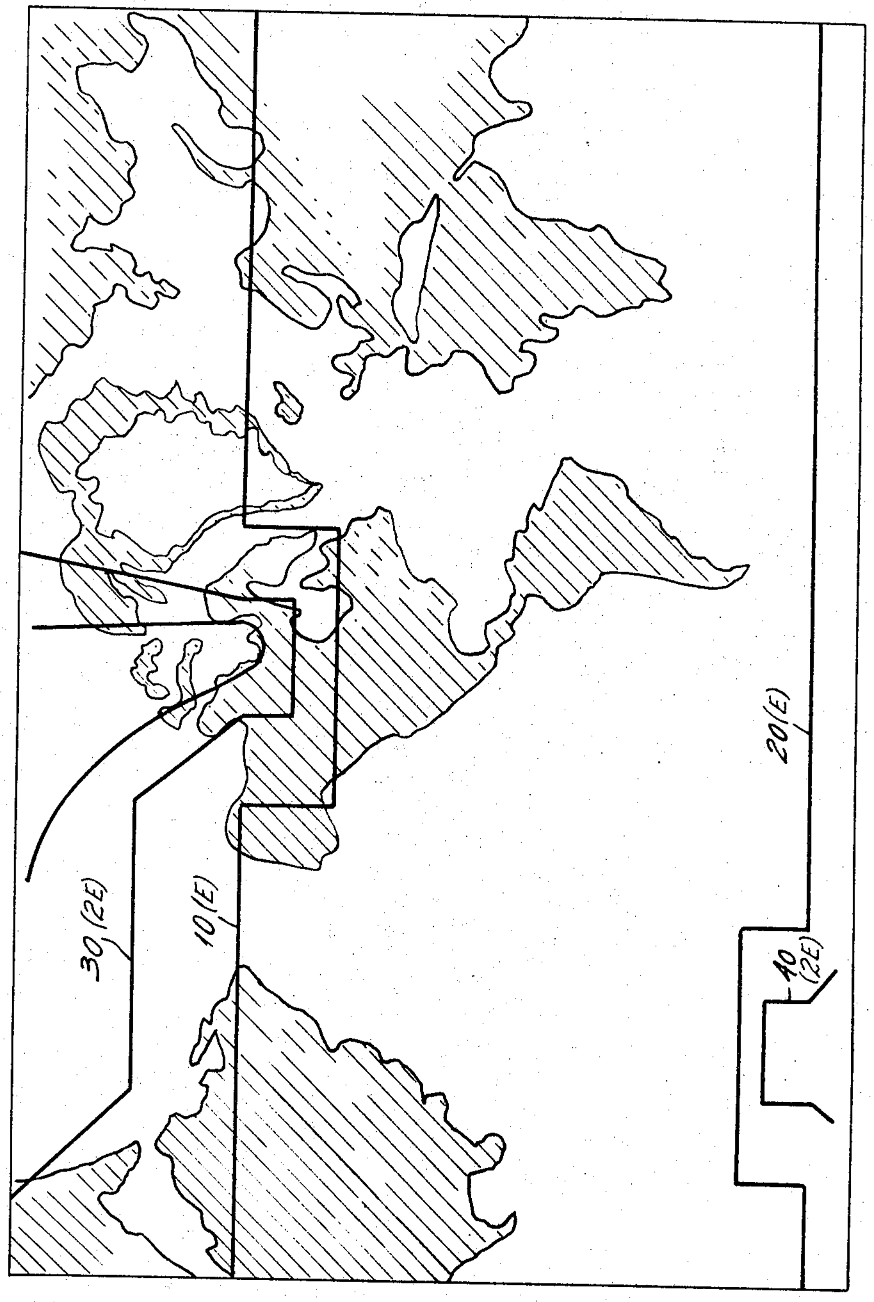
FIGURE 1 is a simplified representation of a geodetic map indicating magnetic variation, with the scale factor regions of our invention being indicated.

FIGURE 1 represents a geodetic map over a portion of the earth's surface, and indicates the angular difference, or variation, between the north magnetic pole and actual geographic north as a function of present location.

It is well-known to employ a three-dimensional cam, the surface of which is cut to store magnetic variation information by the U.S. Navy Hydrographic Office, such as Chart 1706 for the Mercator world-wide projection, shown in FIGURE 1. The cam is cut, in accordance with a desired lift scale (as determined by the system parameters) to translate its cam follower proportional to the magnetic variation corrections, as the cam is rotated in accordance with latitude and the follower longitudinally moved in accordance with longitude. Such a cam is typically shown in U.S. Patent No. 3,033,462, issued May 8, 1962 in the name of Gucker et al. entitled "Correcting 3-D Cam Errors" and assigned to the assignee of the instant invention. Although such magnetic variation information can be predetermined throughout (with acceptable accuracy) the world, including a major portion of the polar regions, previous devices have been limited to operate principally within the intermediate region of the earth's surface enclosed by lines 10, 20. The variation gradient increases rapidly north of line 10 and south of line 20 to such an extent as to impose practical limitations upon cam follower operation. Accordingly, when it was heretofore desired to extend beyond the intermediate regions, substantially as defined by 10–20, it has been necessary to restrict such sharp rises; such restriction resulting in the introduction of smoothing errors into the stored cam function.

As will be subsequently shown, our invention avoids the necessity of introducing such smoothing errors by combining the cam follower function with a scale factor signal. More specifically, the scale factor generator provides an increasing signal in those regions intermediate lines 10–30 and 20–40 wherein the gradient is excessive, thereby avoiding high pressure angles and the need for smoothing the cam surface. The extreme polar regions north of line 30 and south of line 40 will be operable in the conventional free gyro mode. Accordingly, only a small portion of the earth's surface is deleted from the cam storage unit, with the cam surface representing accurate magnetic variation information over substantially 98% of the earth's surface.

As will also be subsequently set forth below, the annual change signal, to compensate for any changes which occur as a result of the shifting of the poles is generated in an analogous manner. Accordingly, by combining the annual change cam function with a suitable scale factor signal, high pressure angles and smoothing errors may likewise be avoided.

Figure 2:
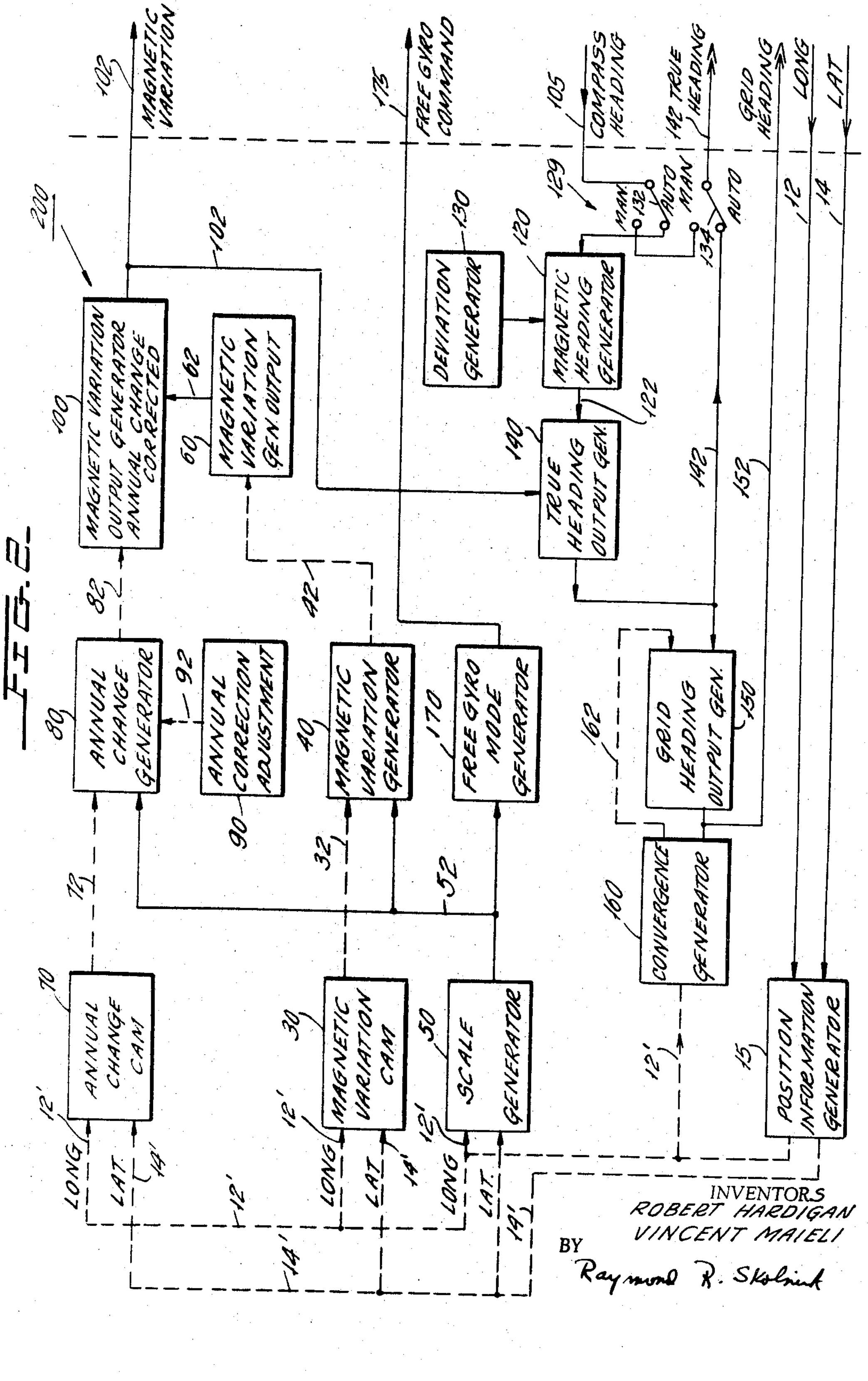
FIGURE 2 is a block diagram illustrating the operation of a preferred form of navigational apparatus constructed in accordance with our invention.

Reference is now made to FIGURE 2, which indicates the operation of navigational computer 200 constructed in accordance with the preferred teachings of our invention. Longitudinal and latitudinal input information 12, 14, respectively is provided by a conventional type device such as the AN/ASB–9 bomb-nav computer installed as standard equipment on the B–52 aircraft. The longitudinal and latitudinal information is then presented to a position information generator 15 to obtain the requisite signals 12', 14' for operation of the location responsive computing apparatus of our invention.

Position information generator 15 may advantageously be a two-speed positional servo. Due to the high rate of change of magnetic variation in the polar regions, computing accuracy is directly related to positional accuracy; hence, the use of a two-speed system is preferable.

Considering first the generation of the magnetic variation information, longitude and latitude information 12', 14' from the position informaiton generator 15 is directed to magnetic variation cam unit 30. The cam storage device of magnetic variation cam assembly 30 is responsive to the longitudinal and latitudinal signals 12', 14' in the conventional manner to yield an output signal 32 combinedly responsive thereto. The output signal 32 of the magnetic variation cam assembly 30 is presented to magnetic variation generator 40 for combination with a scale factor signal 52 in accordance with the preferred teachings of our invention.

Figure 3:
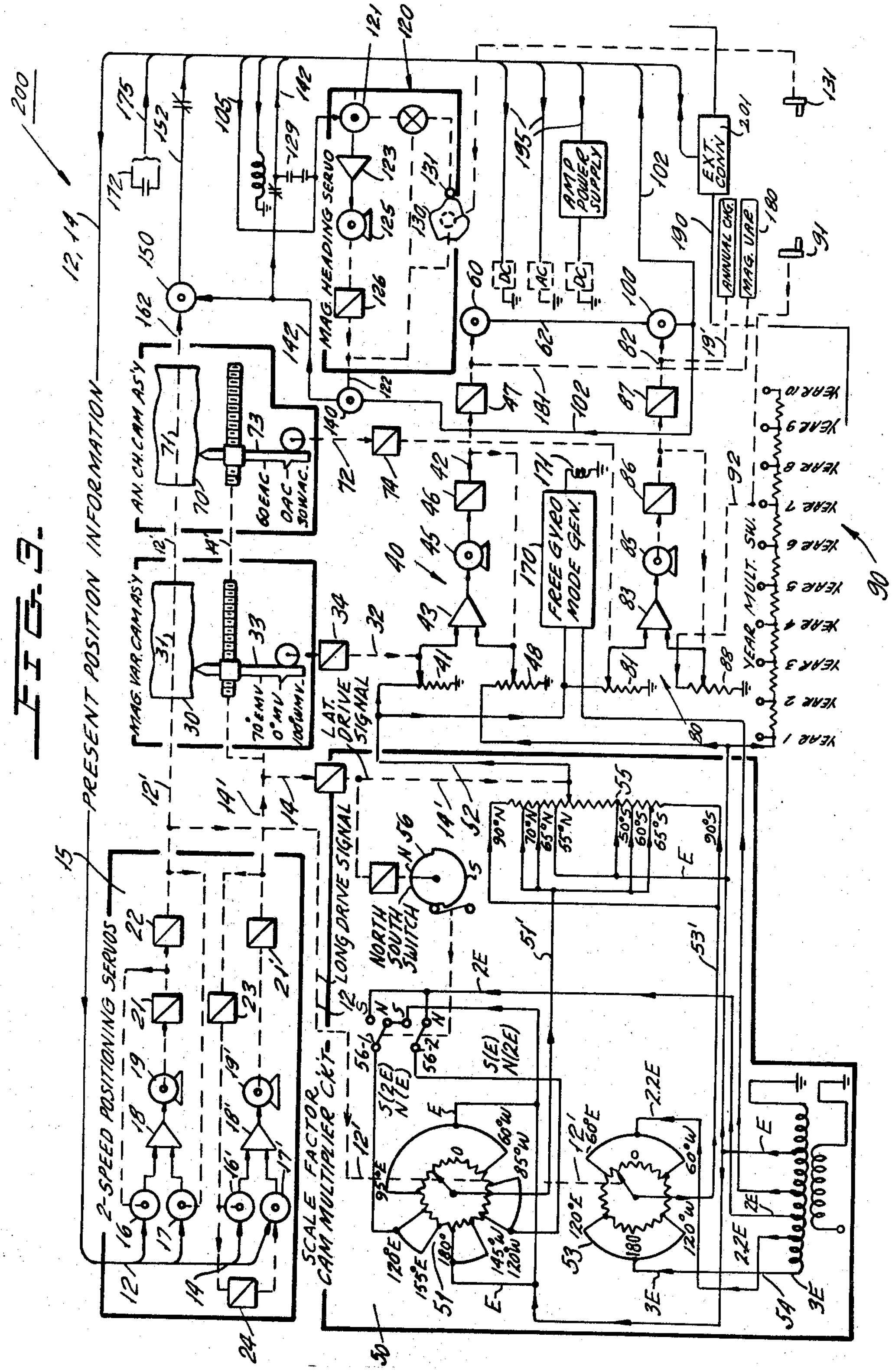
FIGURE 3 is a schematic rperesentation of the apparatus shown in FIGURE 2.

The scale factor signal 52 is generated in scale factor generator 50, more fully described in conjunction with FIGURE 3, and corresponds to the gradient variation regions as shown in FIGURE 1. Accordingly, the output signal 42 of the magnetic variation generator is dependent on the magnetic variation cam signal 32 as compensated for operation over regions of excessive magnetic variation by the scale factor signal 52. Magnetic variation signal 42 is then presented to magnetic variation output assembly 60, which provides the magnetic variation output signal 62.

The operation of the annual change cam 70 is substantially similar to that discussed above in conjunction with the magnetic variation cam. Longitudinal information 12' and latitude information 14' are presented thereto in the conventional manner to provide output signal 72 combinedly responsive thereto. Signal 72 is then presented together with scale factor signal 52 to annual change generator 80. Advantageously, an annual correction adjustment device 90 presents a signal 92 to annual change generator 80 to provide periodic annual adjustment, thereby permitting operation over extended periods of time, as for example ten years, without necessitating a change of the basic storage cams contained in units 70 and 30. The annual change signal 82 is then presented to the magnetic variation output device 100, wherein annual change signal 82 is combined with magnetic variation signal 62 to yield an output signal 102 representing instantaneous magnetic variation appropriately time corrected.

Increased versatility of operation is provided by the further provision of a compass heading input signal 105 obtained from a conventional type of magnetic compass. Compass heading signal 105 is presented to magnetic heading generator 120 via bypass switch arrangement 129 (to be subsequently discussed). Magnetic heading generator 120 is preferably connected to a deviation generator 130 to provide a correction signal responsive to local magnetic disturbances in the aircraft. The deviation corrected, magnetic heading signal 122 is then presented to true heading output generator 140, wherein it is combined with magnetic variation signal 102 to provide a true heading output signal 142. Accordingly, it is seen that the output signal 142 represents true heading as computed over substantially 98% of the earth's surface in accordance with the improved magnetic variation and annual change variation apparatus of our invention, with such true heading signal being compensated for annual change and deviation.

To further enhance the operating capabilities of our invention, the true heading signal 142 is presented to a grid heading output generator 150, wherein it is combined with a convergence error signal 162 to provide an instantaneous grid heading signal 152. The appropriate convergence signal 162 provided by convergence generator 160 is naturally dependent upon the map system in use. For polar stereographic charts the convergency angle is equal to the longitude at that location, and accordingly may be directly obtained from longitudinal information signal 12'. Should other charts be used, a conventional servo system may be employed to generate the proper convergency factor, as for example, the convergency factor provided by convergence generator 160 will be 0.62932 for Lambert Conformal and 0.78535 for the JN series charts. Further, the convergence generator 160 may be constructed with a manual adjust convergency factor, thereby permitting use in conjunction with a plurality of map systems.

Referring again to FIGURE 1, it is seen that the extreme polar regions of the earth (north of line 30 and south of line 40), which may for example approximate 2% of the earth's surface, are to be excluded from operation in conjunction with the cam storage apparatus. When navigating in these polar regions, it is standard practice to operate in a free gyro mode. Such operation may automatically be obtained by the scale factor signal 52. More specifically, scale factor generator 50 may be designed to yield a signal below a predetermined magnitude corresponding to the region of the earth's surface intermediate lines 30 and 40. Accordingly, magnitude of scale factor signal 52 will exceed such a predetermined value when navigating in those regions intended for operation in the free gyro mode. Hence, scale factor signal 52 may be presented to free gyro mode generator 170, which includes a voltage comparator to sense the magnitude thereof and accordingly yield the free gyro command signal 175, through relay 171 and contact 172, indicative of operation in the extreme polar regions.

When operating in the free gyro mode, it has been conventional to first orientate the gyro output to grid north, and thereafter correct for the earth's rate and grid transport. Errors have been found to be introduced by random gyro drift. In our navigational apparatus the gyro is advantageously slaved to the compass heading signal 105 and the appropriate correction factors added to derive grid heading. That is, the addition of magnetic variation and convergence angle to the magnetic heading indication results in a value of grid heading.

Bypass switch 129 is advantageously permitted to bypass of computer 200 responsive to the command of the navigator. That is, when desired switching decks 132, 134 may be moved from the automatic to the manual position to permit the navigator to manually introduce magnetic variation.

Reference is now made to FIGURE 3, which schematically illustrates a navigational computer constructed to operate in the manner discussed above in conjunction with FIGURE 2.

*Position information generator*

The present longitude-latitude information 12, 14 is fed to position information generator 15 which is shown as including a two-speed latitude and longitude positional servo system. Longitude information is received by synchros 16, 17 and converted to angular position via amplifier 18 and servomotor 19. Appropriate gearing assemblies 21, 22 are then provided, with there being a feedback loop intermediate the output gear assembly 21 and synchro 16. Similarly, latitude position information is obtained by members 16' through 21', with additional gearing 23, 24 being illustratively shown in the feedback loop.

*Magnetic variation cam*

Longitude output information 12' provides for the rotation of storage cam 30 about its longitudinal axis 31, with cam follower 33 being movable along the length of cam 30 responsive to latitude signal 14'. Accordingly, the output signal 32 provided by cam follower 33 via gearing 34 is combinedly to both the latitude and longitude input information. Magnetic variation signal 32 is then presented to magnetic variation generator unit 40, wherein it effects movement of the adjustable contact of potentiometer 41. Potentiometer 41 is impressed with the scale factor signal 52 obtained by scale factor generator 50, in the manner to be discussed below, to effect the requisite combination between the cam follower signal 32 and the scale factor signal 52, thereby limiting sharp rises at regions of the cam surface corresponding to an excessive variation gradient.

*Scale factor generator*

The scale factor signal 52 is generated by potentiometers 51, 53, the moving contacts of which are responsive to the longitude signal 12'; potentiometer 55, the moving contact of which is responsive to the latitude signal 14'; and north-south switch 56. Energization of potentiometers 51, 53 is provided by multitap transformer 54 excited by a conventional reference voltage source, which may typically be 10 volts.

Scale factor generator 50 is designed to generate a unity scale factor signal (E) with respect to the reference source over the intermediate region of the earth's surface defined by lines 10, 20 of FIGURE 1. It is naturally understood that other scale factor signals may be generated in this region, with the cooperating cam surface configuration being suitably modified to combinedly obtain the requisite magnetic variation signal 42. Scale factor generator 50 will provide an output signal equal to 2E along the lines 30 and 40, as shown in FIGURE 1. Intermediate lines 10–30 and 20–40 the scale factor signal 52 progressively increases from E to 2E, in a manner uniquely dependent on longitude and latitude, as described below in conjunction with FIGS. 4*a*–4*e*.

Reference is now made to FIGURE 4, which illustrates the scale factor signal 52 generated by the circuitry scale factor generator 50. Referring to potentiometer 55, the waveform of FIGURE 4*a*, it is seen that for any longitude between latitude 50° south and 55° north, the scale factor signal will be equal to the referenced voltage E. In the northern hemisphere between the latitudes 65° north and 70° north, the multiplier voltage $E_{\epsilon 1}$ is a constant, provided by signal 51', which is determined by the longitude location as generated by potentiometer 51. FIGURE 4*b* illustrates the scale factor signal $\epsilon_1$ 52 obtained in this region. Accordingly, it is seen that the potentiometer output signal 51' (and hence the scale factor signal 52 between 65° north and 70° north) will be the referenced voltage E from 0° westward to 60° west, increasing to a value 2E at 85° west (by virtue of the energization from switch contact 56–2), remaining constant at 2E until 120° west and then decreasing back to E at 145° west. With north-south switch 56 being in the position shown in FIGURE 3, and corresponding to a northern hemisphere reading, the 120° east tap of potentiometer 51 is energized by switch contact 56–1 to a value E, thereby resulting in a potential of E from 145° westward to 0°.

Referring again to FIGURE 4*a*, in the region between 55° north and 65° north, the scale factor voltage 52 is linearly dependent with latitude and longitude position. The potential $\epsilon_4$ at 90° north is determined by potentiometer 53 as illustrated by the waveform of FIGURE 4*c*. Accordingly, from 0° to 60° west, the scale factor signal will be the value of 2.2E, increasing linearly to the value of 3E at 120° west, and remaining at that value till 120° east; then decreasing linearly to a value of 2.2E at 60° east, and remaining at that value until 0°.

Figure 4A:
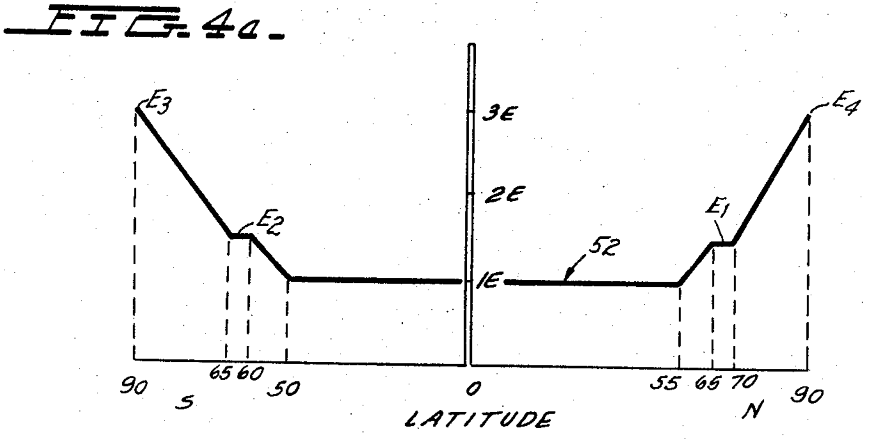
Figure 4B:
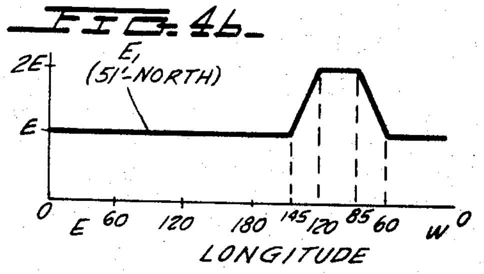
Figure 4D:
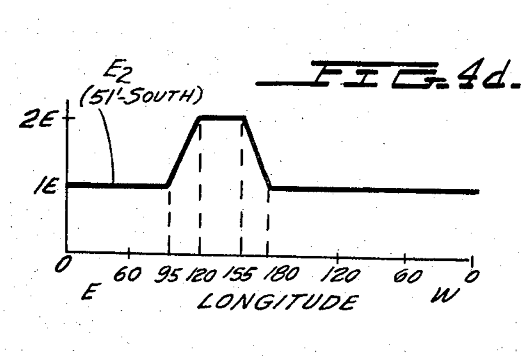
Figure 4C:
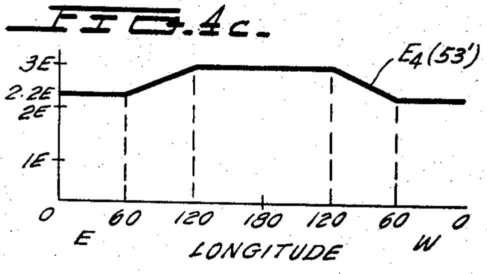

Referring again to FIGURE 4*a*, the scale factor signal 52 is linearly dependent with respect to both latitude and longitude intermediate 70° north and 90° north, between the value $\epsilon_1$ shown by the waveform of FIGURE 4*b* to $\epsilon_4$ shown by the waveform of FIGURE 4*c*.

It has been found that by providing the aforesaid manner of scale factor signal generation, the potential distribution curve represented by output scale factor signal 52 will correspond to the shape of the potential distribution curve as shown in FIGURE 1. Also, a scale factor signal equal to 2E will be generated along the line 30 of FIGURE 1.

In the southern hemisphere, switch 56 is activated to its other position shown, thereby applying a potential 1E at contact 52–2 to the 120° west tap of potentiometer 51, and 2E at contact 56–1 to the 120° east tap. Referring again to FIG. 4*a*, and potentiometer 55, it is seen that in the southern hemisphere between the latitudes 60° south and 65° south, the multiplier voltage $\epsilon_2$ is a constant, provided by signal 51', which is determined by the longitude variation, as generated by potentiometer 51 (with north-south switch 56 being in the south position). FIG. 4*d* illustrates the scale factor signal $\epsilon_2$ obtained in this region. Accordingly, it is seen that the potentometer output signal 51' (and hence the scale factor signal 52 between 60° south and 65° south) will be reference voltage E from 0° westward to 180°, increasing to a value 2E at 155° east remaining constant at 2E until 120° east, and then decreasing back to E at 95° east and remaining at E until 0. Referring again to FIG. 4*a*, in the region between 50° south and 60° south, the scale factor voltage 62 is linearly dependent with latitude and longitude position, between E and $\epsilon_2$. The potential at $\epsilon_3$ at 90° south is determined by potentiometer 53, as illustrated by waveworm 4*e*. Accordingly, from 0° to 60° west, the scale factor will be the value of 2.2E, increasing linearly to the value of 3E at 120° west, and remaining at this value until 120° east, then decreasing linearly to a value of 2.2E at 60° east and remaining at that value until 0°.

Figure 4E:
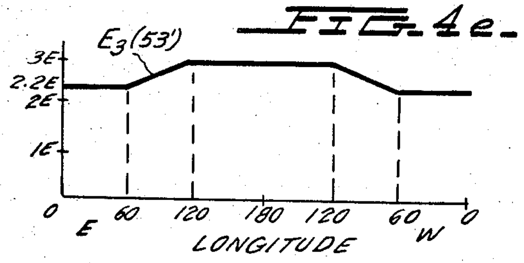

Referring again to FIG. 4*a*, the scale factor signal 52 is linearly dependent with respect to both latitude and longitude intermediate 65° south and 90° south, between the value $\epsilon_2$ shown by the waveform of FIG. 4*b*, to $\epsilon_3$ shown by the waveform of FIG. 4*e*.

Referring again to the potentiometers 51, 53 and 55 for generating the above discussed waveforms, it is noted that potentiometers 51 and 53 are simultaneously driven by the same longitudinal drive signal 12', which rotates the cam assemblies 31 and 71; and potentiometer 55 is driven by the same latitude drive signal 14, which longitudinally translates the cam followers of cam members 31, 71. Thus, the simultaneous drive of the scale factor potentiometers (51, 53, 55), with the cam storage means (31, 71) will serve to generate a scale factor signal which is operatively responsive and instantaneously related to the operative position of the cam. To further assist in correlating the waveforms of FIGS. 4*a*–4*e*, to the cam multiplier circuitry of FIG. 3, the potentiometer has been designated to indicate the location of its adjustable output terminal corresponding to the input latitude and longitudinal signals, with the excitation levels of transformer 54 also being indicated.

*Magnetic variation generator*

Returning to a consideration of the magnetic variation generator 40, the required scale factor multiplication is illustratively shown as obtained with a standard potentiometer follower servo. As discussed above, potentiometer 41 is positioned by the cam follower with the scale factor signal 52 being applied thereto. The output signal of potentiometer 41 is presented to servo amplifier 43, the output of which is presented to conventional servomotor 45 and through appropriate gearing assemblies 46, 47 to magnetic variation output generator 60. The feedback loop of the servo system is provided by follower potentiometer 48, energized by reference voltage E. Magnetic variation output generator 60 may typically comprise a conventional type of control transmitter. The magnetic variation signal 42 may also be presented to a monitoring display 180 located external to the computer housing (as shown in FIGURE 5*a*) via connection 181.

*Annual change generator*

Reference is now made to the annual change cam 70 and generator 80, wherein those components performing the like function described above in conjunction with the magnetic variation portion of the apparatus are indicated by similarly designated numerals. That is, annual change cam 70 is rotatable about its axis 71 responsive to the longitude signal 12', with cam follower 73 positioned along the length thereof responsive to the latitude signal 14' to obtain output signal 72 responsive to the stored information at the present longitude and latitude locations. Signal 72 is then presented to the moving contact of potentiometer 81, which potentiometer is energized by the scale factor signal 52. A standard potentiometer follower servo arrangement is provided to combine the cam responsive signal 72 with the scale factor signal 52, which potentiometer follower servo includes amplifier 83, servomotor 85, gearing assemblies 86, 87 and follower potentiometer 88 to complete the servo loop. A monitoring display 190 of annual change signal 82 may be provided by tap-off connection 191.

*Annual correction adjustment*

In accordance with an advantageous aspect of our invention, the yearly correction multiplication factor 92 is introduced by varying the potential applied to the follower potentiometer 88. That is, updating the cam to the year of use is accomplished by manually adjusting a year multiplier switch 91 (mounted on the front panel of the unit, as shown in FIGURE 5*a*) to the appropriate year position. Accordingly, in as much as magnetic variation and annual change information can be accurately predicted for a ten year period, the apparatus of our invention may be made operable for such a period by provision of the aforesaid annual correction factor. It is naturally understood that should such information be available for a longer period of time, the multiplication circuitry provided by apparatus 90 may be accordingly modified to lengthen the period of use.

At the conclusion of the ten year (or similar) period, a new set of cams 30, 70 may be required to correct for irregularities in the annual changes that have occurred during that period. Alternatively, depending upon the changes transpiring, it may be possible to increase the longevity of the apparatus beyond the original period by a simple modification (preferably performed in the field) of replacing the resistor network of the annual correction adjustment apparatus 90.

*Magnetic variation output generator*

The corrected annual variation signal 82 is then directed to magnetic variation output generator 100, where it is combined with magnetic variation signal 62 to obtain output signal 102 representative of magnetic variation appropriately corrected for annual changes.

*Free gyro mode generator*

To obtain the requisite transfer to the free gyro mode corresponding to present location in those portions of the earth's surface north of line 30 and south of line 40 (as shown in FIGURE 1), a free gyro mode generator 170 is employed. The free gyro mode generator operates in conjunction with a scale factor signal 52. As discussed above, this signal exceeds a value of 2E, corresponding to free gyro mode locations. Accordingly, a voltage comparator circuit may be used to activate a relay 171 whenever the potential of the scale factor signal exceeds a predetermined value, as for example 1.95E. Whenever this value is exceeded, relay 171 will energize, closing contacts 171' and thereby providing the free gyro command signal 175.

*True heading generator*

True heading signal 142 is obtained by the provision of an additional input signal 105, responsive to magnetic, or compass heading. The compass heading signal 105 is presented, (via bypass switch arrangement 129), to magnetic heading generator 120. Magnetic heading generator 120 advantageously includes a servo arrangement to prevent loading of the compass systems by the computer apparatus of our invention. The employment of a servo system also advantageously permits the use of a deviation cam generator 130 to correct for stray magnetic disturbances in the aircraft. The compass heading signal 105 is presented to synchro 121, which feeds amplifier 123, energing servomotor 125 to position true heading output generator 140, via gear assembly 12. True heading output generator 140 may typically be a synchro differential of the type discussed above in conjunction with magnetic variation output generator 100. True heading output generator 140 also receives annual corrected, magnetic variation signal 102 to thereby provide a composite output signal 142 indicating true heading.

*Grid heading generator*

Grid heading is introduced by adding a convergence angle to the true heading signal 142. The convergence angle signal 162 may be direct longitudinal information for polar stereographic charts. This signal is presented to grid heading output generator 150, which may typically be a synchro differential of the type utilized in devices 140 and 100, wherein it is combined with true heading signal 142 to combinedly obtain the grid heading output signal 152.

Accordingly, it is seen that output signals 102, 142 and 152 yield magnetic variation, true heading and grid heading information throughout substantially 98% of the earth's surface, thereby greatly enhancing the applicability and versatility of operation of our apparatus over the navigational computers heretofore known.

The lower right-hand corner of FIGURE 3 indicates the externally located region of the navigational apparatus 200 of our invention. External connector 201 provides the above discussed input of present longitude and information 12 and 14, compass heading 105, and energizing potentials 195, as well as the output signals corresponding to magnetic variation 102, true heading 142, grid heading 152, and the free gyro command 175. Magnetic variation and annual change monitoring display 180, 190 are provided as well as the year multiplier switch 91, and deviation cam adjustment 131.

Accordingly, as shown in FIGURES 5, *5a* and *5b*, the overall device is constructed to be easily included within numerous navigational systems. Preferably, a single case frame is provided to include compartments and mounting surfaces for the necessary gearing and component decks, cam assemblies and circuit card banks. The frame also supplies a direct support and rigid alignment for the continuous mechanical linkage, which runs from one end of a computer to the other. As shown, the apparatus is encased in a "bathtub" style housing hermetically sealed with all the access to the operating mechanism being through the cover.

Accordingly, it is seen that our invention provides a convenient and efficient apparatus for generating magnetic variation, true heading and the grid heading information over greater portions of the earth's surface than has heretofore been possible. In the foregoing description this invention has been described with a preferred illustrative embodiment. Many variations and modifications will now become apparent to those skilled in the art. As, for example, modification of the scale factor signals or convergence angle factor for the particular charts in use. Accordingly, we prefer not to be bound by the specific disclosure contained herein, but only by the appended claims.

The embodiments of the invention in which an exclusive privilege or property is claimed are defined as follows:

1. A storage apparatus for generating an output signal predeterminedly responsive to a plurality of dependent variables, comprising a three-dimensional cam having a predetermined surface configuration; said cam being rotatable about its longitudinal axis responsive to a first dependent variable; a cam follower positionable along the length of said cam responsive to a second dependent variable, whereby the location of said cam follower on said cam surface is combinedly related to said first and second dependent variables to provide a cam follower signal; a scale factor generator; means for actuating said scale factor generator responsive to at least one of said dependent variables, said scale factor generator including means for generating a scale factor signal predeterminedly related to at least said one dependent variable simultaneously with said cam follower signal and operatively dependent on the cam follower location; said cam follower signal and scale factor signal being combinedly presented to means for generating said output signal whereby said output signal is responsive to both said cam follower location and scale factor signal; said cam surface having a first region in which the gradient of cam surface change substantially corresponds to the gradient of said output signal, and a second region whereby the gradient of cam surface change is appreciably less than the gradient of said output signal, said scale factor signal having a greater value at said second region, thereby reducing the required cam surface gradient for the desired output signal gradient.

2. A storage apparatus for generating an output signal predeterminedly responsive to a plurality of dependent variables, comprising a three-dimensional cam having a predetermined surface configuration; said cam being rotatable about its longitudinal axis responsive to a first dependent variable; a cam follower positionable along the length of said cam responsive to a second dependent variable, whereby the location of said cam follower on said cam surface is combinedly related to said first and second dependent variables to provide a cam follower signal; a scale factor generator; means for actuating said scale factor generator responsive to at least one of said dependent variables, said scale factor generator including means for generating a scale factor signal predeterminedly related to at least said one dependent variable simultaneously with said cam follower signal and operatively dependent on the cam follower location; said cam follower signal and scale factor signal being combinedly presented to means for generating said output signal whereby said output signal is responsive to both said cam follower location and scale factor signal; said cam having a surface configuration in accordance with the known magnetic variation error over a substantial portion of the earth's surface; said cam surface having a first region in which the gradient of cam surface change substantially corresponds with the magnetic variation gradient of that portion of the earth, and a second region wherein the gradient of cam surface change is appreciably less than the magnetic variation of that portion of the earth; said first and second dependent variables being longitude and latitude locations respectively, and said scale factor signal having a greater magnitude at regions of the earth's surface corresponding to said second cam surface region, whereby the cam surface rises to establish said output signal at said second region may be reduced in comparison to the actual gradient of magnetic variation.

3. A storage apparatus as set forth in claim 2, said first cam surface region corresponding to the intermediate portions of the earth's surface, and said second cam surface region corresponding to predetermined portions of the earth's surface adjacent the polar regions; said scale factor being unity corresponding to the intermediate portions of the earth's surface, and greater than unity corresponding to the predetermined portions of the earth's surface adjacent the polar regions.

4. A storage apparatus as set forth in claim 6, further including means for generating a switching signal responsive to longitude and latitude locations within predetermined regions of the earth's surface; said predetermined regions being the extreme polar regions, and corresponding to those portions of the earth's surface not represented by said cam surface; whereby said switching signal actuates auxiliary navigating means operable in said predetermined regions; said scale factor signal being presented to said means for generating said switching signal when said scale factor signal exceeds a predetermined magnitude, corresponding to said extreme polar regions.

5. A storage apparatus for generating an output signal responsive to a plurality of dependent variables, comprising first and second three-dimensional cams, each having a predetermined surface configuration; said cams being rotatable about their longitudinal axis responsive to a first dependent variable; first and second cam follower means, each positionable along the length of their respective cam responsive to a second dependent variable, whereby the locations of said cam followers on their respective cam surfaces are combinedly related to said first and second dependent variables; a scale factor generator; means for actuating said scale factor generator responsive to at least one of said dependent variables and means for generating scale factor signals operatively responsive to the location of said cam followers along their respective cam surfaces; first and second means for generating first and second cam follower signals responsive to said first and second cam follower locations respectively, means for presenting said scale factor signals to at least one of said last-mentioned means, and means for combining said first and second signals to obtain said output signal, whereby said output signal is responsive to said first and second cam follower locations, and said scale factor signals.

6. A storage apparatus for generating an output signal responsive to a plurality of dependent variables, comprising first and second three-dimensional cams, each having a predetermined surface configuration; said cams being rotatable about their longitudinal axis responsive to a first dependent variable; first and second cam follower means, each positionable along the length of their respective cam responsive to a second dependent variable, whereby the locations of said cam followers on their respective cam surfaces are combinedly related to said first and second dependent variables; a scale factor generator; means for actuating said scale factor generator responsive to at least one of said dependent variables and means for generating scale factor signals operatively responsive to the location of said cam followers along their respective cam surfaces; first and second means for generating first and second cam follower signals responsive to said first and second cam follower locations respectively, means for presenting said scale factor signals to at least one of said last-mentioned means, and means combining said first and second signals to obtain said output signal, whereby said output signal is responsive to said first and second cam follower locations, and said scale factor signals; the surface configuration of said first cam representing the known magnetic variation of a substantial portion of the earth's surface and said cam surface having a first region in which the gradient of cam surface change substantially corresponds with the magnetic variation gradient of that portion of the earth, and a second region wherein the gradient of cam surface change is appreciably less than the magnetic variation of that portion of the earth; the surface configuration of said second cam representing the annual variation change over said substantial portion; said first and second dependent variables being longitude and latitude locations respectively; said scale factor signals having a greater magnitude at regions of the earth's surface corresponding to the second surface region of said first cam, whereby the cam surface rises to establish said output signal at said excessive regions may be reduced in comparison to the actual gradient of magnetic variation.

7. A navigational apparatus comprising a first cam storage means for generating a first cam variation signal responsive to predetermined magnetic variation about the earth's surface; scale factor means for generating a scale factor signal in accordance with the instantaneous operative portion of said first cam storage means; first combining means for continuously and simultaneously combining the instantaneous values of said first cam variation signal and scale factor signal to obtain a magnetic variation signal; second cam storage means for generating a second cam variation signal responsive to annual variation change about the earth's surface; second combining means for combining said second cam variation and scale factor signals to obtain an annual variation signal; first output means combining said magnetic variation and annual variation signals to obtain a first output signal; said first output signal representing instantaneous magnetic variation over a substantial portion of the earth's surface.

8. A navigational apparatus comprising a cam storage means for generating a first cam variation signal responsive to predetermined magnetic variation about the earth's surface; scale factor means for generating a scale factor signal in accordance with the instantaneous operative portion of said cam storage means; means for continuously and simultaneously combining the instantaneous values of said cam variation signal and scale factor signal to obtain a magnetic variation signal representing magnetic variation over a substantial portion of the earth's surface, further including means for generating a magnetic heading signal; means combining said magnetic heading and magnetic variation signals to obtain a true heading output signal over said substantial portion of the earth's surface.

9. A navigational apparatus for the automatic computation of magnetic variation including storage means representing annual change corrected magnetic variation over a substantial portion of the earth's surface; longitude and latitude input means; means actuating said storage means responsive to said longitude and latitude input means; and first output means operatively connected to said storage means for establishing a first output signal representing instantaneous magnetic variation; means for generating a magnetic heading signal; second output means combining said first output signal and said magnetic heading signal to obtain a second output signal; said second output signal representing true heading; means for generating a convergence signal; third output means combining said second output signal and said convergence signal to obtain a third output signal; said third output signal representing grid heading over a substantial portion of the earth's surface.

References Cited

UNITED STATES PATENTS

| | | | |
|---|---|---|---|
| 2,660,371 | 11/1953 | Campbell et al. | 235—61.5 |
| 2,752,091 | 6/1956 | McKenney et al. | 235—150.27 |
| 2,843,318 | 7/1958 | Gray | 235—150.27 |
| 2,953,299 | 9/1960 | Nagy et al. | 235—61.5 |
| 2,996,244 | 8/1961 | Kissin | 235—61.5 |
| 3,033,462 | 5/1962 | Gucker et al. | 235—197 |
| 3,145,298 | 8/1964 | Shoemaker | 235—197 |
| 3,238,441 | 3/1966 | Gucker | 323—43.5 |

MARTIN P. HARTMAN, *Primary Examiner.*

U.S. Cl. X.R.

318—489; 235—61.5; 244—77